Figure 1:
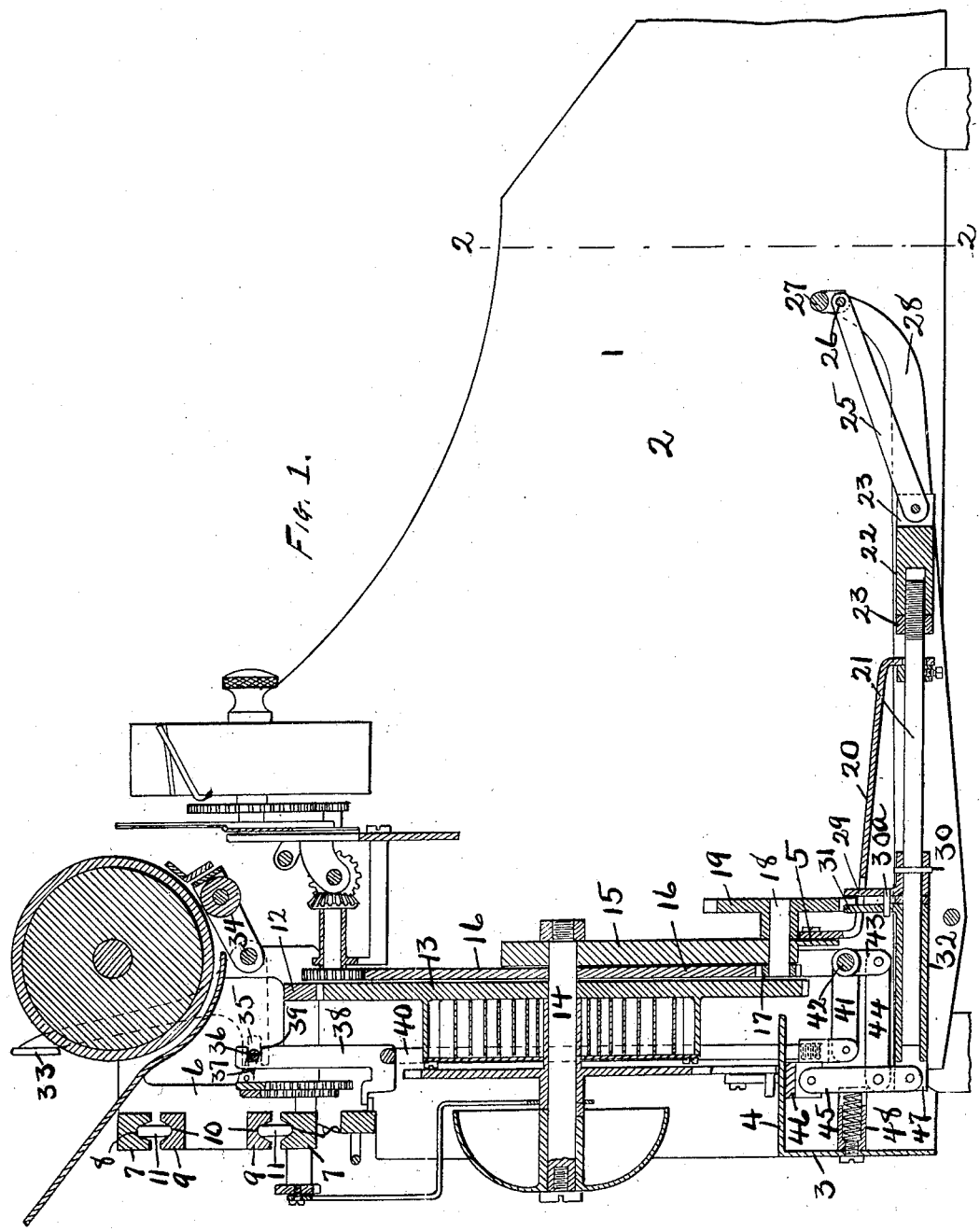

J. W. PAUL.
TYPE WRITING MACHINE.
APPLICATION FILED MAY 10, 1907.

902,507.

Patented Oct. 27, 1908.

2 SHEETS—SHEET 1.

Witnesses
Bessie F. Parker
Ed Roach

Inventor
John W. Paul
by N. C. Lind
Attorney

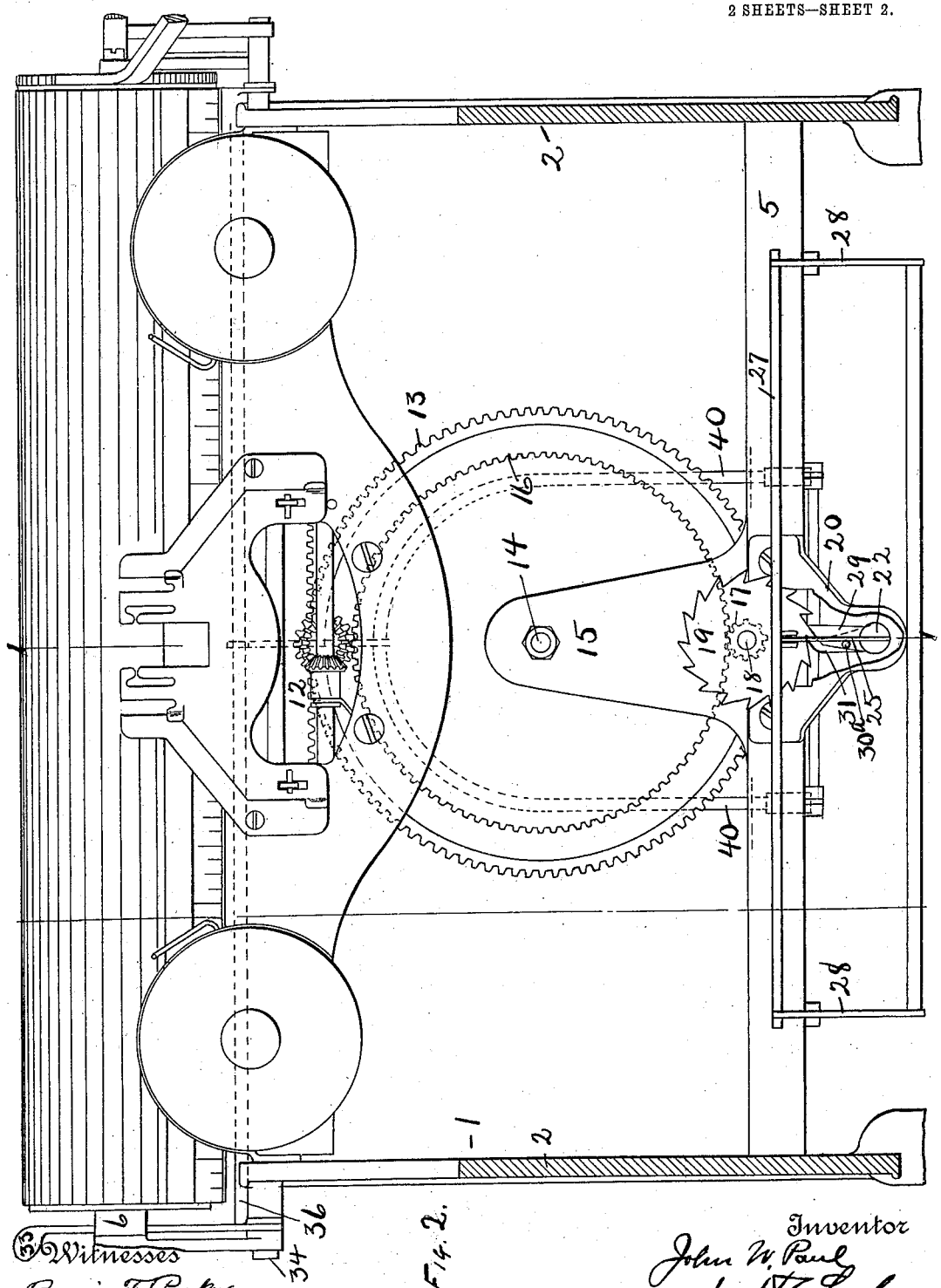

UNITED STATES PATENT OFFICE.

JOHN W. PAUL, OF KITTANNING, PENNSYLVANIA.

TYPE-WRITING MACHINE.

No. 902,507.

Specification of Letters Patent.

Patented Oct. 27, 1908.

Application filed May 10, 1907. Serial No. 372,843.

*To all whom it may concern:*

Be it known that I, JOHN W. PAUL, a citizen of the United States, residing at Kittanning, in the county of Armstrong and State of Pennsylvania, have invented new and useful Improvements in Type-Writing Machines, of which the following is a specification.

This invention relates to typewriting machines and consists in certain improvements in the construction thereof as will be hereinafter fully described and pointed out in the claims.

More particularly the invention relates to the carriage escapement.

The invention is illustrated in the accompanying drawings as follows:

Figure 1 shows a section on the line 1—1 in Fig. 2. Fig. 2, a section on the line 2—2 in Fig. 1.

1 marks the frame as a whole; 2 the side of the frame; 3 a cross piece at the rear of the frame; 4 a horizontal plate extending forwardly from the cross piece 3; 5 a downwardly extending lip at the front of the plate 4.

6 marks the carriage. The rails 7 extend across the machine at the back edge of the carriage. These rails are provided with the grooves 8. The carriage rail 9 is secured to the rear part of the carriage and is provided with the groove 10. The wheels 11 are arranged in the grooves 8 and 10, forming a roller bearing for the carriage. The carriage rack 12 is at the bottom of the carriage and meshes a gear 13. The gear 13 is pivoted on the shaft 14. The shaft 14 is supported by a post 15 extending upwardly from the plate 4. The gear 16 is journaled on the shaft 14 and is fixed with the gear 15 by any desired means. (Not shown.) A pinion 17 meshes the gear 16. The pinion is fixed on the shaft 18. The shaft is journaled in the post 15. An escapement wheel 19 is fixed on the front end of the shaft 18.

A hanger 20 is secured to the lip 5 and extends forwardly and forms a bearing for a reciprocating rod 21. The front end of the reciprocating rod is screw threaded and the head 22 is secured on this rod. A jam nut 23 secures the head in place. The head has the slot 23. A link 25 extends into this slot and is pivotally connected with the head 22. The link is pivotally connected at 26 with the universal bar 27. The universal bar is carried by the levers 28, one at each side of the machine. These levers are pivoted near the rear of the machine in any desired manner.

The dog 29 is fixed on the rod 21 by means of the pin 30. The dog 31 extends from a sleeve 32. The sleeve is slidingly mounted on the rod 21. A pin 30$^a$ extends from the dog 29 through the dog 31 and locks the dog 31 against rotative movement on the rod 21.

The release lever 33 is arranged at the top of the machine. It is pivotally mounted on the rod 34 and has a slot 35 in its rear edge, the whole forming a bell crank lever. The slot 35 extends over a rod 36. The rod 36 is fixed in swinging rock arms 37, one at each side of the machine. The fixed relation of the rod with the rock arms compelling a parallel movement of the rock arms. An extension 38 has a slot 39 which engages the rod 36. This extension is fixed on the bearing 40 and the ends of the bearing are preferably connected with the rock arms 41. The rock arms 41 are fixed on the rod 42. A rock arm 43 extends downwardly from the rod 42 and is connected by a link 44 with a lever 45. The lever swings from a hanger 46 below the plate 4 and extends into a slot 47 in the rear of the sleeve 32 and it is pivotally connected with said sleeve 32. The lever also extends into a spring socket 48 which acting on the lever, tends to hold the sleeve 32 in a forward position so that the dog 31 is in the path of the escapement wheel.

In the operation of the typewriter, the universal bar is operated in the usual manner and its movement is communicated to the rod 21 through the link 25, the link and rod acting as a toggle lever with relation to the universal bar. Of course if the universal bar were pivoted with the same axis as the link 25 no movement would be accomplished. In the preferred construction the pivot of the universal bar is at the rear of the connections between the rod 21 and link 25. Other arrangements, however, may be used. By turning the head 22 any adjustment of these parts desired may be had. The link 25 locks the head against turning. I prefer, however, to add the jam nut 23.

The dogs 29 and 31 are offset sufficiently to permit the escapement of the wheel 19 as the dogs are reciprocated. (See Fig. 2).

When the releasing lever 33 is moved forward, it lifts the rod 36 and this rod running through the slot 39 operates upon the extension 38 wherever the carriage may be and lifts the bail 40. The movement of the bail is communicated through the rock levers 41 and 43 to the link 44 and by the link 44 to the lever 45 and from the lever 45 to the sleeve 32. As the sleeve is pulled back through the action of this mechanism the dog 31 is moved out of the path of the wheel 19 so that the carriage may be freely moved in either direction.

What I claim as new is:

1. In a typewriting machine the combination of a carriage escapement wheel; a reciprocating rod extending in a direction from front to rear of the machine; the universal bar; a link connecting the universal bar with the rod and arranged to act with the rod as a toggle lever and to communicate the movement of the universal bar to the rod; and dogs actuated by the rod for controlling the movement of the escapement wheel.

2. In a typewriting machine the combination of a carriage escapement wheel; a reciprocating rod extending in a direction from front to rear of the machine; a universal bar swingingly mounted with its pivot toward the rear of the machine; a link connecting the rod with the universal bar, the pivot between the rod and the link being in front of the pivot of the universal bar the link connection forming with the bar a toggle lever; and dogs actuated by the rod for controlling the movement of the escapement wheel.

3. In a typewriting machine the combination of a carriage escapement wheel; a reciprocating rod extending in a direction from front to rear of the machine; a universal bar swingingly mounted with its pivot toward the rear of the machine; a link connecting the rod with the universal bar, the pivot between the rod and the link being in front of the pivot of the universal bar and its connection with the universal bar being in front of the connection with the rod said link forming a toggle lever; and dogs actuated by the rod for controlling the movement of the escapement wheel.

4. In a typewriting machine the combination of a carriage escapement wheel; a reciprocating rod extending in a direction from front to rear of the machine; the head 22 adjustably secured to the front of said rod; a connection between the head and the universal bar and arranged to communicate the movement of the universal bar to the rod; and dogs actuated by the rod for controlling the movement of the escapement wheel.

5. In a typewriting machine the combination of a carriage escapement wheel; a reciprocating rod extending in a direction from front to rear of the machine; the head 22 adjustably secured to the front of said rod; a link connecting the universal bar with said head and arranged to act with the head and rod as a toggle lever and to communicate the movement of the universal bar to the rod.

6. In a front-strike typewriting machine the combination of a carriage escapement wheel; a rod extending in a direction from front to rear of the machine in a position to permit of placing a type basket above it; a universal bar; means for communicating movement from the universal bar to the rod to reciprocate the rod in an axial direction; and dogs mounted on the rod for controlling the movement of the escapement wheel one of said dogs being pivotally mounted on said rod.

7. In a front-strike typewriting machine the combination of a carriage escapement wheel; a reciprocating rod arranged in a position to permit of placing a type basket above it; and extending in a direction from front to rear of the machine; the universal bar; means for communicating movement from the universal bar to the rod; dogs mounted on the rod for controlling the movement of the escapement wheel, one of said dogs being locked against rotative and axial movement on the rod and the other of said dogs locked against rotation but free to slide on the rod, said dogs being offset to permit of the escapement of the wheel when reciprocated; and a releasing mechanism for actuating the sliding dog to move it out of the path of the escapement wheel.

8. In a front-strike typewriting machine the combination of a carriage escapement wheel; a reciprocating rod arranged in a position to permit of placing a type basket above it, and extending in a direction from front to rear of the machine; the universal bar; means for communicating movement from the universal bar to the rod; dogs mounted on the rod for controlling the movement of the escapement wheel, one of said dogs being locked against rotation and axial movement on the rod and another of said dogs being locked against rotation but free to slide on the rod, said dogs being offset to permit of the escapement of the wheel when reciprocated; a releasing mechanism for actuating the sliding dog to move it out of the path of the escapement wheel; a releasing lever placed at the top of the machine; and connecting mechanism between the releasing lever and the sliding dog to effect the release of the escapement.

9. In a typewriting machine the combination with the escapement wheel 19 arranged near the bottom of the machine; the reciprocating rod 21; the universal bar; a connection between the universal bar and the rod 21; the fixed dog 29 mounted on the rod; the sliding dog 31 extending from the sleeve 32, said dog being locked against rotative movement on the rod but slidingly mounted thereon; and means connected with the sleeve 32 for moving the dog to release the escapement.

10. In a typewriting machine the combination with a carriage escapement wheel 19 arranged near the bottom of the machine; dogs acting on the escapement wheel; the universal bar; a spring actuated by the universal bar for actuating the dog; the release lever 33 having the slot 35 therein and pivotally mounted to give a bell crank action to the slot; the rod 36 extending across the machine; the arms 37 to which the rod 36 is fixed, said arms 37 being pivotally mounted; the extension 38 with the slot 37 for engaging the rod 36; the bail 41 connected with the extension; the rock levers 41 and 43 fixed on the shaft 42; the shaft 42; the bail 40, being connected with the lever 41; the link connected to the rock lever 43; the lever 45 actuated by the link and arranged to actuate the dogs to effect an escapement.

11. In a typewriting machine the combination with the carriage escapement wheel 19 arranged near the bottom of the machine; a rod 21 slidingly mounted and extending from front to rear of the machine; the universal bar; a connection between the universal bar and the rod communicating the movement of the universal bar to the rod; the release lever 33 having the slot 35 therein and pivotally mounted to give a bell crank action to the slot; the rod 36 extending across the machine; the arms 37 to which the rod 36 are fixed, said arms 37 being pivotally mounted; the extension 38 with the slot 37 for engaging the rod 36; the bail 41 connected with the extension; the rock levers 41 and 43 fixed on the shaft 42; the shaft 42; the bail 40, being connected with the lever 41; the link connected to the rock lever 43; the lever 45 actuated by the link; the dog 29 fixed on the rod and the dog 31 having the sleeve 32 locked against rotation but slidingly mounted on the rod, the sleeve 32 being connected with the lever 45.

In testimony whereof I have hereunto set my hand in the presence of two subscribing witnesses.

JOHN W. PAUL.

Witnesses:
TRACY J. LORD,
SARAH A. DALEY.